United States Patent
Zhou et al.

(10) Patent No.: US 9,498,832 B2
(45) Date of Patent: Nov. 22, 2016

(54) RECIPROCATING SAW BLADE ASSEMBLY

(71) Applicants: NingBo Gemay Industry Co., Ltd., NingBo, Zhejiang Province (CN); Richpower Industries, Inc., Williamston, SC (US)

(72) Inventors: Lifeng Zhou, Williamston, SC (US); Xuefeng Xu, NingBo (CN)

(73) Assignees: Richpower Industries Inc., Williamston, SC (US); NingBo Gemay Industry Co., Ltd., NingBo, Zheijang Province (CN)

(*) Notice: Subject to any disclaimer, the term of this patent is extended or adjusted under 35 U.S.C. 154(b) by 29 days.

(21) Appl. No.: 14/794,324

(22) Filed: Jul. 8, 2015

(65) Prior Publication Data
US 2015/0336189 A1      Nov. 26, 2015

Related U.S. Application Data

(63) Continuation-in-part of application No. 14/082,262, filed on Nov. 18, 2013, now Pat. No. 9,101,992.

(51) Int. Cl.
*B23D 49/00* (2006.01)
*B23D 61/12* (2006.01)

(52) U.S. Cl.
CPC ........... *B23D 49/006* (2013.01); *B23D 61/121* (2013.01); *B23D 61/123* (2013.01); *Y10T 83/6895* (2015.04)

(58) Field of Classification Search
CPC  B23D 49/006; B23D 61/123; B23D 51/025; B23D 51/00; A01G 3/047–3/0535

USPC ..................................... 83/751; 30/208, 233
See application file for complete search history.

(56) References Cited

U.S. PATENT DOCUMENTS

| | | | | |
|---|---|---|---|---|
| 2,435,863 A | * | 2/1948 | Wydro | A61B 17/14 606/177 |
| 2,784,751 A | * | 3/1957 | Alexander | B23D 61/123 30/394 |
| 2,853,106 A | * | 9/1958 | Kanthack | B23D 49/14 30/501 |
| 2,895,514 A | | 7/1959 | Wright | |
| 3,189,998 A | * | 6/1965 | Beisheim | B23D 49/006 30/210 |
| 3,270,369 A | * | 9/1966 | Mandell | A22B 5/205 30/394 |
| 3,303,563 A | * | 2/1967 | Peterson | B23D 49/006 30/277.4 |
| 3,465,438 A | * | 9/1969 | Marsh | B23D 51/025 30/220 |
| 3,470,923 A | * | 10/1969 | Besthorne | B23D 49/11 144/133.1 |

(Continued)

FOREIGN PATENT DOCUMENTS

| CN | 202388057 U | 8/2012 |
|---|---|---|
| TW | 201134584 A | 10/2011 |
| WO | 2012121994 A1 | 9/2012 |

*Primary Examiner* — Sean Michalski
(74) *Attorney, Agent, or Firm* — Thrive IP; Bernard S. Klosowski

(57) ABSTRACT

A saw blade assembly for a power saw includes a housing blade assembly having a plurality of saw teeth depending therefrom and a blade disposed within the housing blade assembly, the blade and the housing blade assembly being drivable in opposite directions by a reciprocating driver mechanism.

6 Claims, 8 Drawing Sheets

(56) References Cited

U.S. PATENT DOCUMENTS

| | | | | |
|---|---|---|---|---|
| 3,821,902 | A * | 7/1974 | Du Bois | A47J 43/087 310/50 |
| 4,631,827 | A * | 12/1986 | Moores | B23D 49/006 30/277.4 |
| 4,665,618 | A * | 5/1987 | Leini | B23D 49/16 30/392 |
| 4,719,701 | A | 1/1988 | Williams | |
| 4,784,034 | A | 11/1988 | Stones et al. | |
| 4,798,001 | A | 1/1989 | Grossmann et al. | |
| 4,856,195 | A | 8/1989 | Grossmann et al. | |
| 4,953,301 | A * | 9/1990 | Dobbs, Jr. | B23D 51/025 30/392 |
| 4,969,270 | A | 11/1990 | Berghauser et al. | |
| 4,979,305 | A * | 12/1990 | Leini | B23D 49/006 30/369 |
| 4,999,915 | A * | 3/1991 | Jackson | B23D 49/006 30/369 |
| 5,031,324 | A | 7/1991 | Berghauser et al. | |
| 5,349,754 | A * | 9/1994 | Wuensch | B23D 49/006 30/369 |
| 5,473,820 | A * | 12/1995 | Neubert | B23D 49/006 30/369 |
| 5,926,960 | A * | 7/1999 | Heywood | A01G 3/053 30/216 |
| 9,101,992 | B2 * | 8/2015 | Zhou | B23D 49/006 |
| 2003/0177645 | A1 * | 9/2003 | Flury | F16P 1/00 30/392 |
| 2003/0192191 | A1 * | 10/2003 | Wong | A22C 17/0013 30/277.4 |
| 2005/0044720 | A1 * | 3/2005 | Huang | A01G 3/053 30/224 |
| 2012/0017447 | A1 * | 1/2012 | Nie | A01G 3/053 30/228 |
| 2012/0240418 | A1 * | 9/2012 | Gatten | B23D 51/18 30/371 |
| 2013/0092006 | A1 * | 4/2013 | Zhou | B23D 49/006 83/835 |
| 2013/0232796 | A1 * | 9/2013 | Nikas | B26B 19/06 30/208 |
| 2013/0247391 | A1 * | 9/2013 | Armstrong | B23D 49/003 30/392 |
| 2014/0047720 | A1 * | 2/2014 | Vitantonio | B23D 49/006 30/369 |
| 2015/0135543 | A1 * | 5/2015 | Gatten | A01G 3/085 30/392 |

* cited by examiner

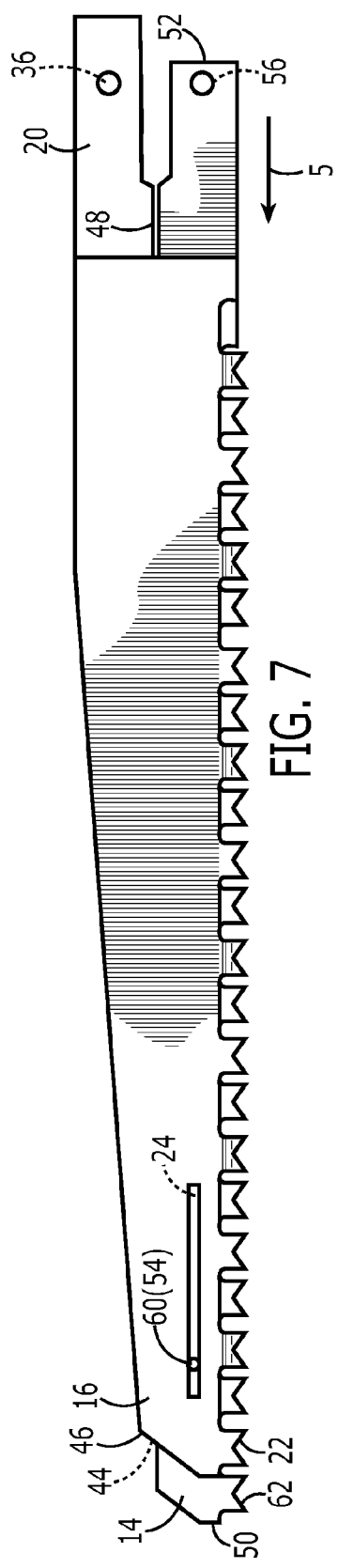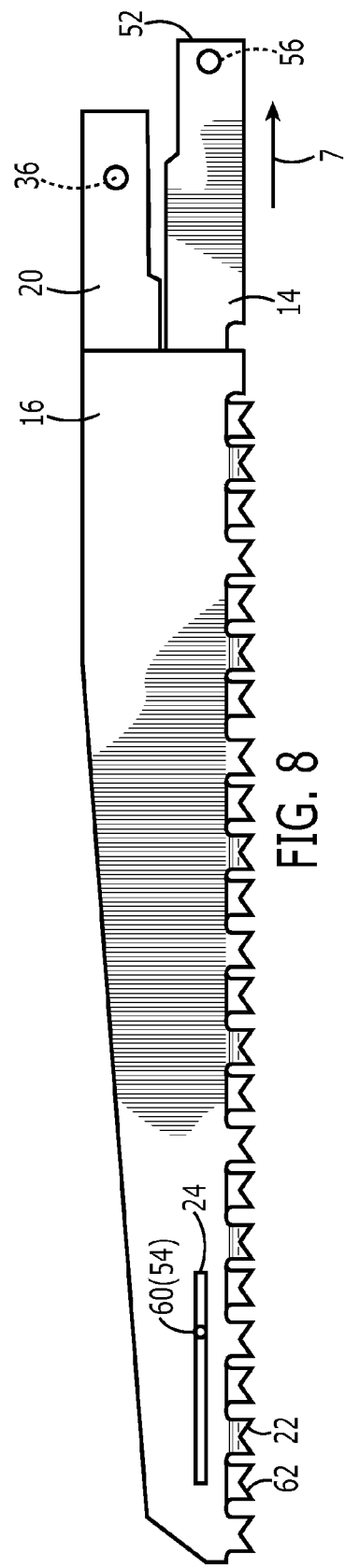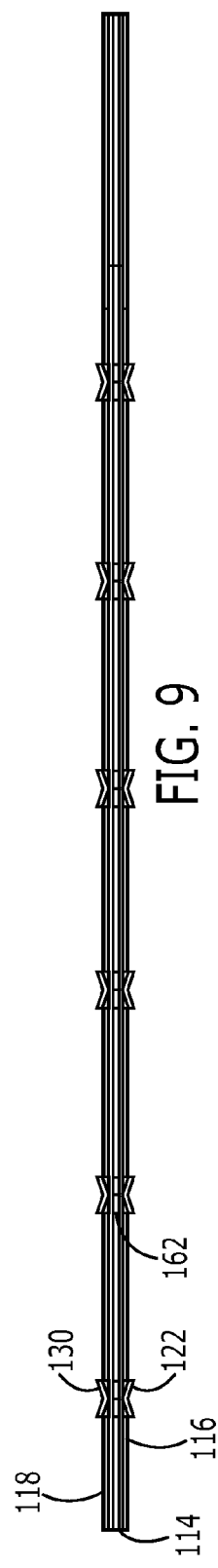

RECIPROCATING SAW BLADE ASSEMBLY

CROSS-REFERENCE TO RELATED APPLICATIONS

This utility patent application claims benefit of U.S. patent application Ser. No. 14/082,262, filed Nov. 18, 2013, which is incorporated herein in its entirety by reference thereto.

BACKGROUND OF THE DISCLOSURE

The saw blade industry lacks a reciprocating saw that reduces kickback and vibrations in order to provide smooth and consistent cuts. The needed saw should be cost effective and easy to manufacture and use.

BRIEF SUMMARY OF THE DISCLOSURE

The present disclosure is directed in general to a reciprocating, double-bladed saw blade assembly. The assembly incorporates a reciprocating, center or servient blade within a reciprocating dual bladed housing having blades arranged on either side of the servient blade. The assembly is connected to a reciprocating sawing mechanism or device to reduce kickback and vibrations to provide smooth and consistent cuts.

For example, according to one embodiment of the present disclosure a saw blade assembly for a power saw includes a housing blade assembly having a first panel and a second panel connected to each other, the first and second panels each having a plurality of saw teeth depending therefrom, the housing blade assembly further including a first means for connection to a reciprocating driver mechanism, the housing blade assembly being drivable in a first direction by the reciprocating driver mechanism; and a blade interposed between the first panel and the second panel of the housing blade assembly, the blade having a plurality of saw teeth depending therefrom and including a second means for connection to the reciprocating driver mechanism, the blade being drivable in a second direction by the reciprocating driver mechanism.

The first panel and the second panel may be fixed to each other by one of a weld, an adhesive, pressure, press-fit, and the like. Additionally, or alternatively, the first panel and the second panel may be spaced apart from each other. A spacer may be placed between the first panel and the second panel to form a groove in which the blade moves.

The first connection may be achieved by forming an aperture in a proximal end of the housing blade assembly and configured to attach operatively to the reciprocating driver mechanism. The second connection may be achieved by forming an aperture in a proximal end of the blade configured to attach operatively to the reciprocating driver mechanism.

Also in this aspect, the first direction and the second direction oppose each other, and the housing blade assembly and the blade may be moved or driven equal distances in opposing directions.

The saw blade assembly may further include a detent that extends from the blade. The first panel or the second panel may define a slot in which the detent is configured to operate to limit displacement of the housing blade assembly and the blade relative to each other.

In another embodiment, a saw blade assembly for a power saw may include a housing blade assembly having a first panel and a second panel connected to each other, at least one of the first and second panels having a plurality of saw teeth depending therefrom, the housing blade assembly being drivable in a first direction by the reciprocating driver mechanism; a connecting panel disposed between the first panel and the second panel and forming a channel therebetween, the connecting panel further including a first means for connection to a reciprocating driver mechanism; and a blade disposed within the channel, the blade having a plurality of saw teeth depending therefrom and including a second means for connection to the reciprocating driver mechanism, the blade being drivable in the channel in a second direction by the reciprocating driver mechanism.

In this aspect, the first means for connection may be a proximal end of the connecting panel defining an aperture therethrough configured for operative attachment to the reciprocating driver mechanism. The second means for connection may be a proximal end of the blade having an aperture formed therethrough configured for operative attachment to the reciprocating driver mechanism.

The housing blade assembly may define a distal assembly end and a proximal assembly end adjacent the reciprocating driver mechanism. The blade may have a proximal blade end adjacent the reciprocating driver mechanism and a distal blade end, the distal blade end extending beyond the distal assembly end when driven in the second direction by the reciprocating driver mechanism.

In another embodiment, an exemplary saw blade assembly for a power saw may include a first saw blade and a second saw blade connected to each other, the first and second saw blades each having an upper edge and lower edge, the respective lower edges spaced apart from each other to form a channel therebetween, a plurality of saw teeth depending from one of the first and second saw blades, first means for attaching the connected first and second saw blades to a reciprocating driver mechanism, the first means being configured to drive the first and second saw blades in a first direction by the reciprocating driver mechanism; and a blade disposed within the channel, the blade having a plurality of saw teeth depending therefrom and including second means for attaching to the reciprocating driver mechanism, the second means being configured to drive the blade in a second direction by the reciprocating driver mechanism.

The respective upper edges of the first saw blade and a second saw blade may be connected by one of a weld, a rivet, a screw, an adhesive, or a combination thereof.

The first means for attaching may be a proximal end formed by the connected first and second saw blades, the proximal end having an aperture formed therethrough configured for operative connection to the reciprocating driver mechanism.

The second means for attaching may be a proximal end of the blade having an aperture formed therethrough configured for operative connection to the reciprocating driver mechanism.

In a further embodiment, a saw blade assembly for a power saw may have a housing blade assembly with a first saw and a second saw connected to each other at respective upper edges, one of the first and second saws having a plurality of saw teeth depending therefrom, the first and second saws being spaced apart to form a channel therebetween, the housing blade assembly being configured for operative connection to a reciprocating driver mechanism and being drivable in a first direction by the reciprocating driver mechanism; and a blade interposed between the first saw and the second saw, the blade having a plurality of saw teeth depending therefrom and including means for connection to the reciprocating driver mechanism, the blade being drivable within the channel in a second direction by the reciprocating driver mechanism.

In yet another embodiment, a saw blade assembly for a power saw may include a housing blade assembly having a first panel and a second panel attached to each other, at least one of the first and second panels having a plurality of saw teeth depending therefrom, the housing blade assembly further including a first means for connection to a reciprocating driver mechanism, the housing blade assembly being drivable in a first direction by the reciprocating driver mechanism; and a blade interposed between the first panel and the second panel of the housing blade assembly, the blade having a plurality of saw teeth depending therefrom and including a second means for connection to the reciprocating driver mechanism, the blade being drivable in a second direction by the reciprocating driver mechanism.

The first panel and the second panel may be attached to each other by one of a snap, a weld, an adhesive, pressure, press-fitting, or combinations thereof. A spacer may be provided between the first panel and the second panel to form a groove in which the blade moves.

In a further embodiment according to the disclosure, a saw blade assembly for a power saw may include a housing blade assembly having a first panel and a second panel connected to each other, the first and second panels each having a first plurality of saw teeth depending therefrom, the housing blade assembly further including a first means for connection to a reciprocating driver mechanism, the housing blade assembly being drivable in a first direction and in an opposing second direction by the reciprocating driver mechanism; and a blade interposed between the first panel and the second panel of the housing blade assembly, the blade having a second plurality of saw teeth depending therefrom and including a second means for connection to the reciprocating driver mechanism, the blade being drivable opposite the housing blade assembly in one of the first direction or the opposing second direction by the reciprocating driver mechanism, the blade further comprising a plurality of dust cleaning teeth disposed apart from the second plurality of saw teeth, the plurality of dust cleaning teeth being configured to eject cutting byproduct. In this example, the first means for connection may be a proximal end of the housing blade assembly having an aperture formed therethrough configured to attach operatively to the reciprocating driver mechanism, and the second means for connection may be a proximal end of the blade having an aperture formed therethrough configured to attach operatively to the reciprocating driver mechanism.

In this exemplary assembly, the blade may be spaced apart from the first panel and the second panel. Also, the plurality of dust cleaning teeth may be disposed along a top edge of the blade and spaced apart from a ceiling formed by the first panel and the second panel.

Additional objects and advantages of the present subject matter are set forth in, or will be apparent to, those of ordinary skill in the art from the detailed description herein. Also, it should be further appreciated that modifications and variations to the specifically illustrated, referenced, and discussed features and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 7 is an elevational view of the assembly as in FIG. 3, particularly showing a center blade in a forward position and outer blades in a retracted position;

FIG. 8 is an elevational view of the assembly as in FIG. 7 showing the moving center blade in a retracted position and the outer blades in a forward position;

FIG. 9 is a bottom view of a reciprocating saw blade assembly according to another aspect of the disclosure;

DETAILED DESCRIPTION OF THE DISCLOSURE

Figures 1, 2:
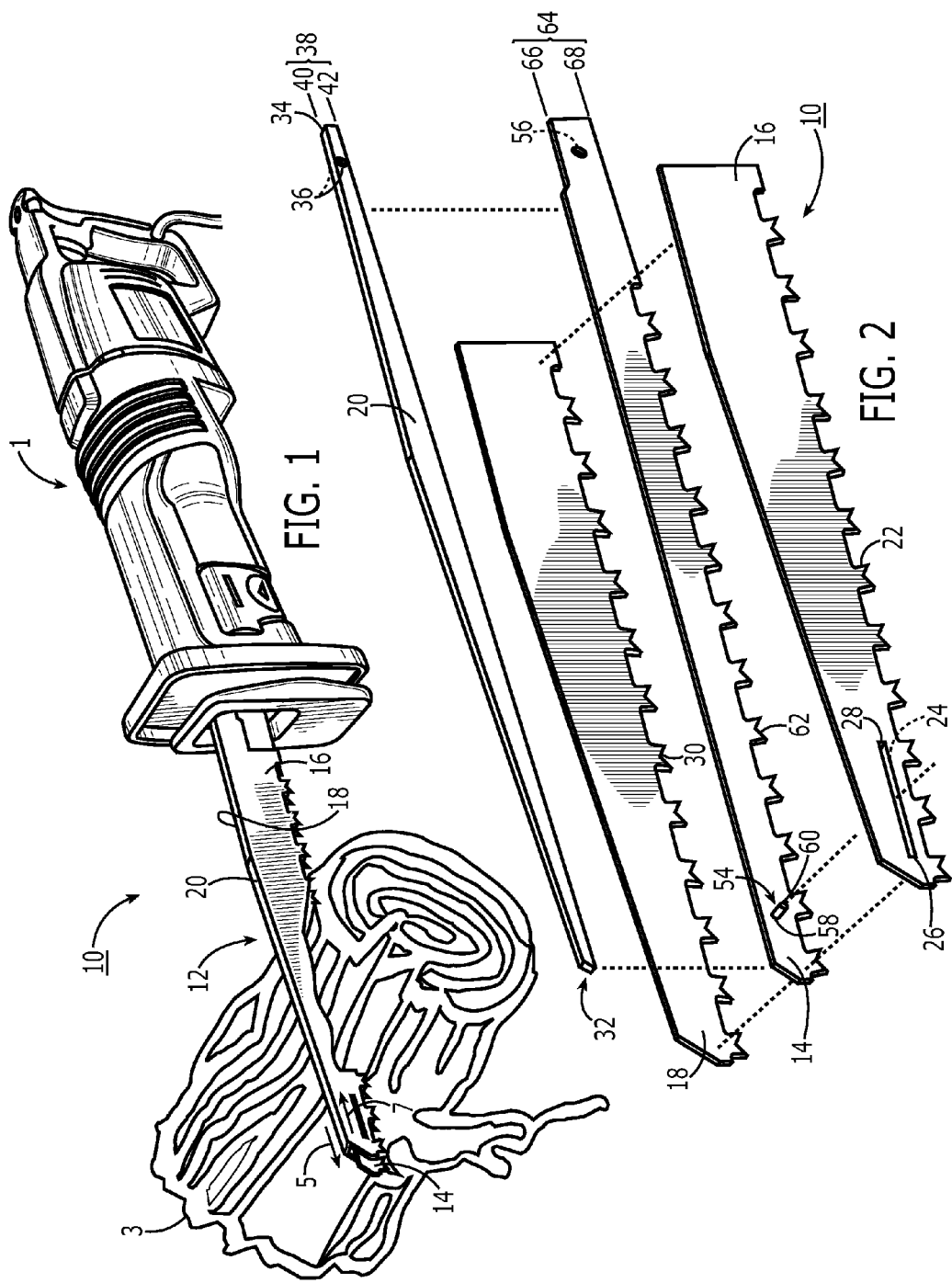
FIG. 1 is a perspective view of a reciprocating saw blade assembly according to an aspect of the disclosure, particularly showing the assembly in use in an intended environment.
FIG. 2 is an exploded, perspective view of the reciprocating saw blade assembly as in FIG. 1.

Detailed reference will now be made to the drawings in which examples embodying the present subject matter are shown. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed description are provided by way of explanation only and are not meant as limitations of the disclosure. The present subject matter thus includes any modifications and variations of the following examples as come within the scope of the appended claims and their equivalents. The detailed description uses numerical and letter designations to refer to features of the drawings. Like or similar designations of the drawings and description have been used to refer to like or similar parts of various exemplary embodiments.

Turning now to FIG. 1, a reciprocating driver mechanism or handheld power saw 1 is shown cutting a work piece such as a piece of wood 3. More specifically, the handheld power saw 1 is equipped with a reciprocating, double-bladed saw blade assembly indicated in general by the number 10. The exemplary saw blade assembly 10 broadly includes a movable or reciprocating bladed housing or main blade 12 in which an inner or center blade 14 moves. The outer blade assembly 12 includes a first or left panel or blade 16 and a second or right panel or blade 18, which are connected to each other via a panel or spacer 20. In this example, the center blade 14 is moving in a first or outward direction 5 while the outer blade assembly 12 is moving in an opposing second or inward direction 7. This opposing arrangement and action reduce kickback and vibration and serve to make smoother and more consistent cuts, as will be described in more detail below.

With reference to FIG. 2, various components of the saw blade assembly 10 are shown unassembled. Here, the first outer blade 16 and the second outer blade 18 include respective saw blades or teeth 22, 30, and the center blade 14 has teeth 62. In this example, the saw teeth 22, 30, 62 each have two teeth or points. Every other tooth of the saw teeth 22, 30 is angled slightly outward for increased cutting or ripping capability. However, the present disclosure is not limited to these exemplary aspects, as the number and style of teeth may be varied according to user requirements.

Also shown in FIG. 2, the spacer 20 is disposed above the center blade 14 and between the outer blades 16, 18. When assembled with the outer blades 16, 18 by welding, adhesives, a rivet, a screw, and/or other mechanical attachments, the spacer 20 forms a channel or groove 44 in which the center blade 14 rides or reciprocates. As shown, the spacer 20 is at least as wide as, or slightly wider than, the blade 14 to permit the blade 14 to reciprocate freely in the groove 44. However, the spacer 20 is not too wide to prevent the blade 14 from veering excessively or bending sideways within the groove 44. These and other aspects are discussed in more detail below with respect to FIGS. 4, 5 and 7.

The spacer 20, as further shown in FIG. 2, has a first or distal end 32 and a second or proximal end 34. In this example, the proximal end 34 includes an attachment point or aperture 36 that connects to a hook or connector in a blade holder (not shown) of the power saw 1 as in FIG. 1. Also shown, the spacer 20 has a height 38 as measured between a top or upper surface 40 and a lower or bottom surface 42 of the spacer 20. As discussed below, the height 38 of the spacer 20 determines in part the size of the channel 44.

Also shown in the embodiment of FIG. 2, a channel, groove or slot 24 having a first or distal end 26 and a second or proximal end 28 is formed in the blade 16. The center blade 14, as shown, includes a projection, pin, bar or detent 54 having a distal end 58 and a proximal end 60. Here, the proximal end 60 is connected or attached to the blade 14 and the distal end 58 extends into the slot 24, which, in this example, is substantially rectangular in shape. The detent 54, which is cylindrically shaped in this example, rides back and forth in the channel 24 during operation of the power saw 1 and its blade assembly 10. This cooperative operation of the projection 54 and the slot 24 serves to limit a maximum displacement of the blade assembly 12 and the center blade 14 relative to each other (compare directions 5, 7 in FIG. 1).

Those skilled in the art will recognize that the disclosure is not limited to the rectangularly shaped channel 24, the cylindrically shaped detent 54, a length of the channel 24 of between about one-eighteenth to about one quarter of a length of the blade 16, nor the exemplary position of the slot 24 as shown in FIG. 2. Furthermore, it will be appreciated that not only may the slot 24 have a different length or shape to accommodate various requirements, there may be multiple slots 24. For instance, another opening or notch such as slot 24 could be formed on the blade 16 spaced closer to the power saw 1. Additionally, the slot 24 or a similar channel could be formed on the blade 18 and a complementary bar like projection 54 could extend from the center blade 14 into that additional channel.

FIG. 2 further shows that the center blade 14 has a connection point, mechanism or aperture 56 like the aperture 36 of the spacer 20. Similar to aperture 36, the aperture 56 is used to attach or connect the center blade 14 to the power saw 1. As shown near the aperture 56, the blade 14 has a height 64 defined by a top or upper surface 66 and a bottom or lower surface 68. The height 64 of the center blade 14 is complementary to the height 38 of the bar 20, which is discussed below with respect to the FIG. 3.

Figure 3:
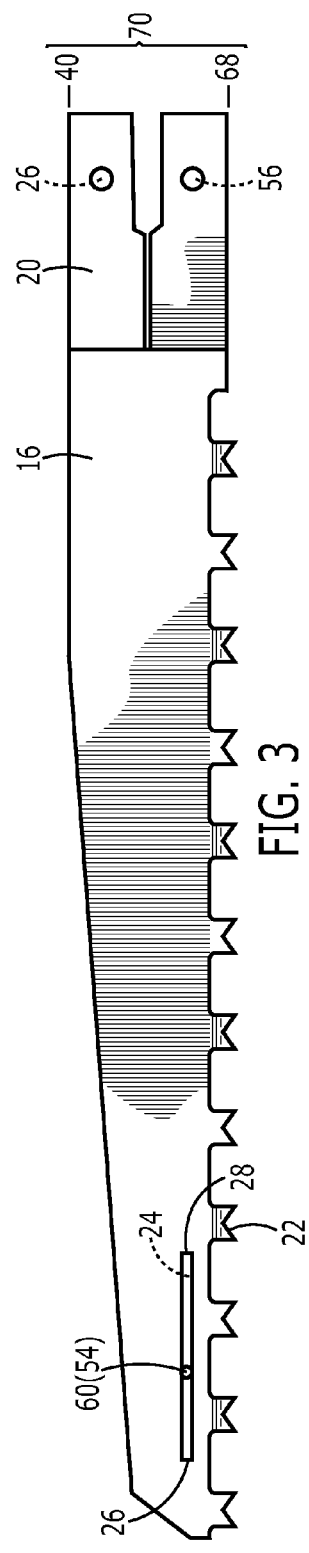
FIG. 3 is an elevational view of the assembly as in FIG. 2.

In FIG. 3, the blade assembly 10 is shown having a height 70, which is defined by the upper surface 40 of the bar 20 and the lower surface 68 of the center blade 14. The respective heights of these components and the overall height 70 are determined by the size of the power saw 1 such as the example in FIG. 1. In other words, for a larger power saw, the overall height 70 of the blade assembly 10 may be greater and conversely, for a smaller saw, the height 70 may be less.

As further shown in FIG. 3, the respective apertures 36, 56 of the bar 20 and the blade 16 and their shapes and positions will be determined, again, by the particular model of the power saw 1 as in FIG. 1. FIG. 3 also shows the blade assembly 10 in a neutral position, wherein the proximal end 60 of the detent 54 is approximately midway between the ends 26, 28 of the blade slot 24. In this example, the proximal end 60 is flush with an outer surface of the blade 16.

Figure 4:
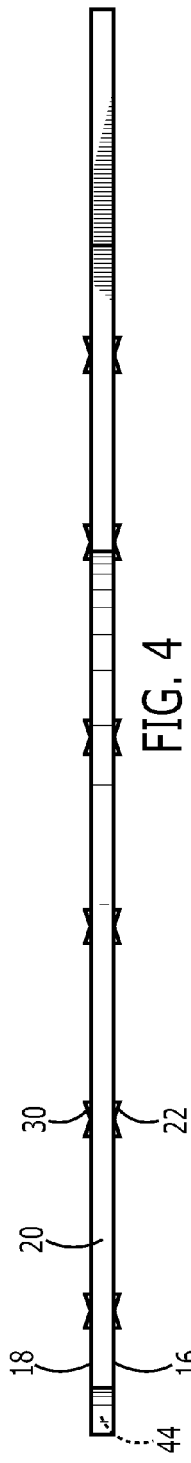
FIG. 4 is a top view of the assembly as in FIG. 3.

Turning to FIG. 4, this top view of the blade assembly 10 most clearly shows that every other saw tooth 22, 30 of the respective blades 16, 18 are angled outward to increase cutting capability. As shown most clearly in FIG. 4 is a portion of the channel 44 in which the center blade 14 (not shown) reciprocates. The channel 44, briefly introduced above, is formed by connected the blades 16, 18 to the spacer 20. As previously noted, the height and width of the channel 44 are functions of the height and width of the spacer 20.

Figure 5:
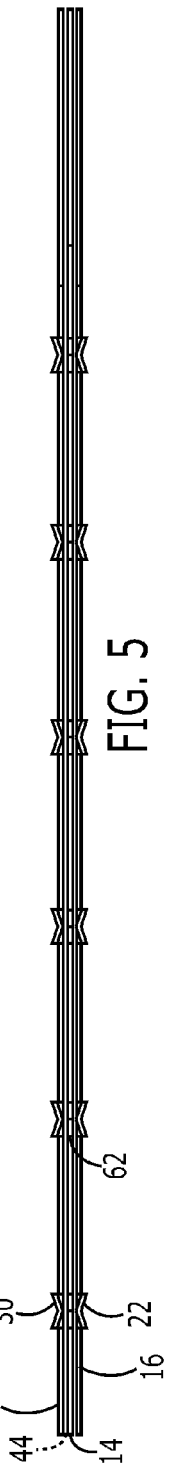
FIG. 5 is a bottom view of the assembly as in FIG. 3.

FIG. 5 is a bottom view of the blade assembly 10 shown in FIG. 4. Here, the angled saw teeth 22, 30 of the respective blades 16, 18 are shown with the teeth 62 of the center blade 14 therebetween. The center blade 14 is shown in a neutral position within the channel 44 and for clarity, only every other saw tooth 22, 30, 62 is shown.

Figure 6:
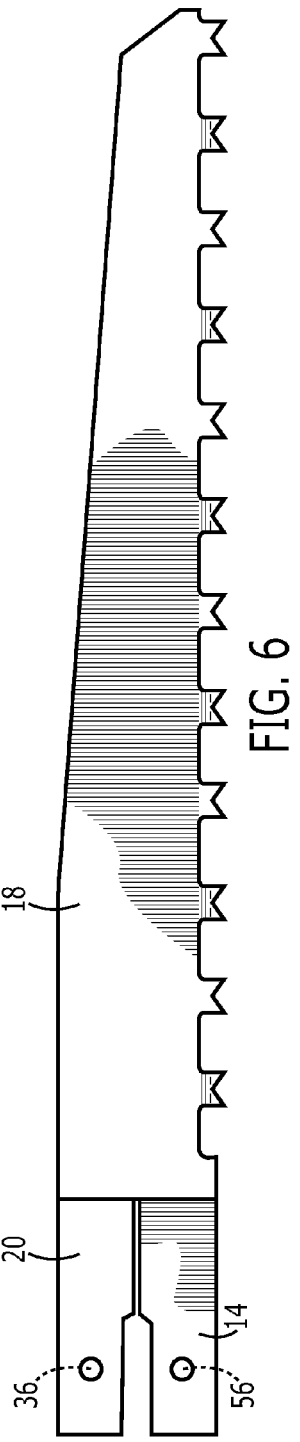
FIG. 6 an opposing elevational view of the assembly similar to FIG. 3.

FIG. 6 is similar to FIG. 3. In this view from the other side of the blade assembly 10, the respective apertures 36, 56 of the spacer 20 and the center blade 14 can be seen. However, in this exemplary view the blade 18 of the blade assembly 10 does not have the slot 24 or complementary bar 54 as shown in FIG. 3. It will be appreciated from this perspective, however, that the blade 18 could include a bar like detent 54 connected to its interior surface and projecting into a channel like slot 24 formed in the center blade 14.

With reference now to FIG. 7, the assembly 10 is shown in a first operational or non-neutral position in which the center blade 14, specifically its first end 50, extends from a first end 46 of the channel 44. This position, also shown in FIG. 1, shows that the power saw 1 has simultaneously retracted the main blade assembly 12 with its blades 16, 18 via the connector 36 while having projected or pushed the center blade 14 in the direction 5 away from the power saw 1 via the connector 56 at the second end 52 of the blade 14. The second end 48 of the channel 44 is also shown.

In FIG. 8, the assembly 10 is shown in a second operational or non-neutral position in which the center blade 14, specifically its second end 52, is retracted along channel 44 in the second direction 7. Compare FIG. 1. Here, the power saw 1 has again simultaneously extended the main blade assembly 12 with its blades 16, 18 via the connector 36 while having retracted the center blade 14 in the direction 7 towards the power saw 1 via the connector 56. By comparing FIGS. 7 and 8, the detent 54 can also be seen in different positions within the blade slot 24. This reciprocating action of the power saw 1 in which the blade 14 is simultaneously moving in an opposite direction (directions 5, 7) from the moving blade housing 12 and its blades 16, 18, and as limited by the detent 54 within the slot 24, the teeth 22, 30, 62 are working with and against each other to cut more efficiently through a work piece with reduced vibration and less chance of kickback, which often occurs when only one blade is moving and cutting.

Figure 10:
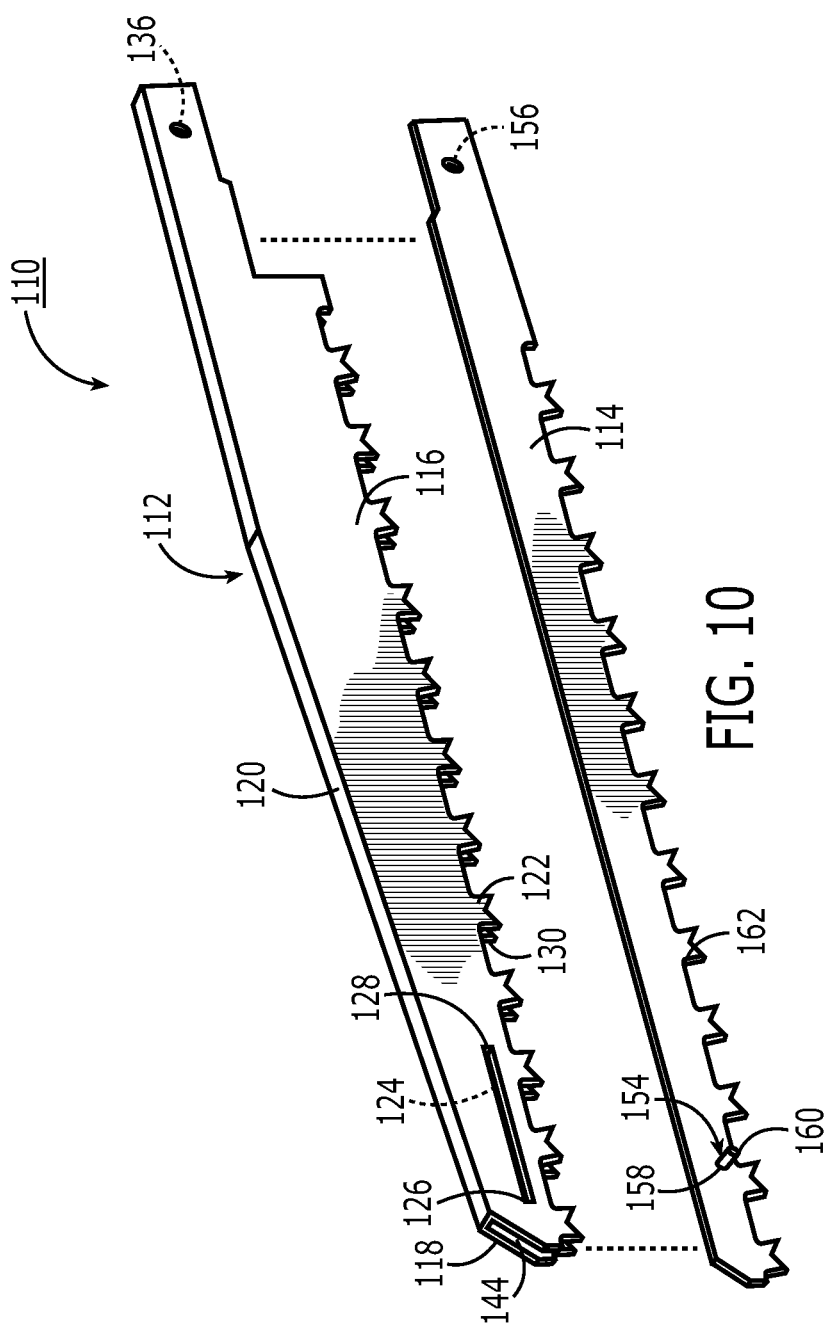
FIG. 10 is a perspective view of the reciprocating saw blade assembly as in FIG. 9.

Turning now to FIGS. 9 and 10, another embodiment of the disclosure is introduced. Here, a saw blade assembly is indicated in general by the reference numeral 110. The saw blade assembly 110 broadly includes a reciprocating dual bladed housing or main blade 112 and a center or central blade 114. The dual blade arrangement 112 has a first side or blade panel 116 and a second side or blade panel 118 connected by a strip or top spacer 120 disposed opposite of saw teeth 122, 130 of respective blade panels 116, 118. As shown most clearly in FIG. 9, the central blade 114 has multiple saw teeth 162 disposed between the saw teeth 122, 130. In this example, every other saw tooth 122, 130 is angled outward away from the center blade 114 for increased cutting capability.

Turning more specifically to FIG. 10, the dual blade assembly 112 also includes a raceway or channel 144 formed by the ceiling 120 between the blades 116, 118 in which the central blade 114 reciprocates. Respective attachment points 136, 156 are used to attach the blades 112, 114 to a power saw (see, e.g., saw 1 in FIG. 1). Also shown in FIG. 10, a groove or race 124 may be formed in one of the blade panels 116, 118. The race 124 may be rectangular in shape and have opposing ends 126, 128 which limit travel of a detent or bar 154 extending from the center blade 114. The bar 154, as shown, may have a length defined from its proximal end 158 to its distal end 160, which may ride flush to a surface of the blade panel, here 116.

Figure 11:
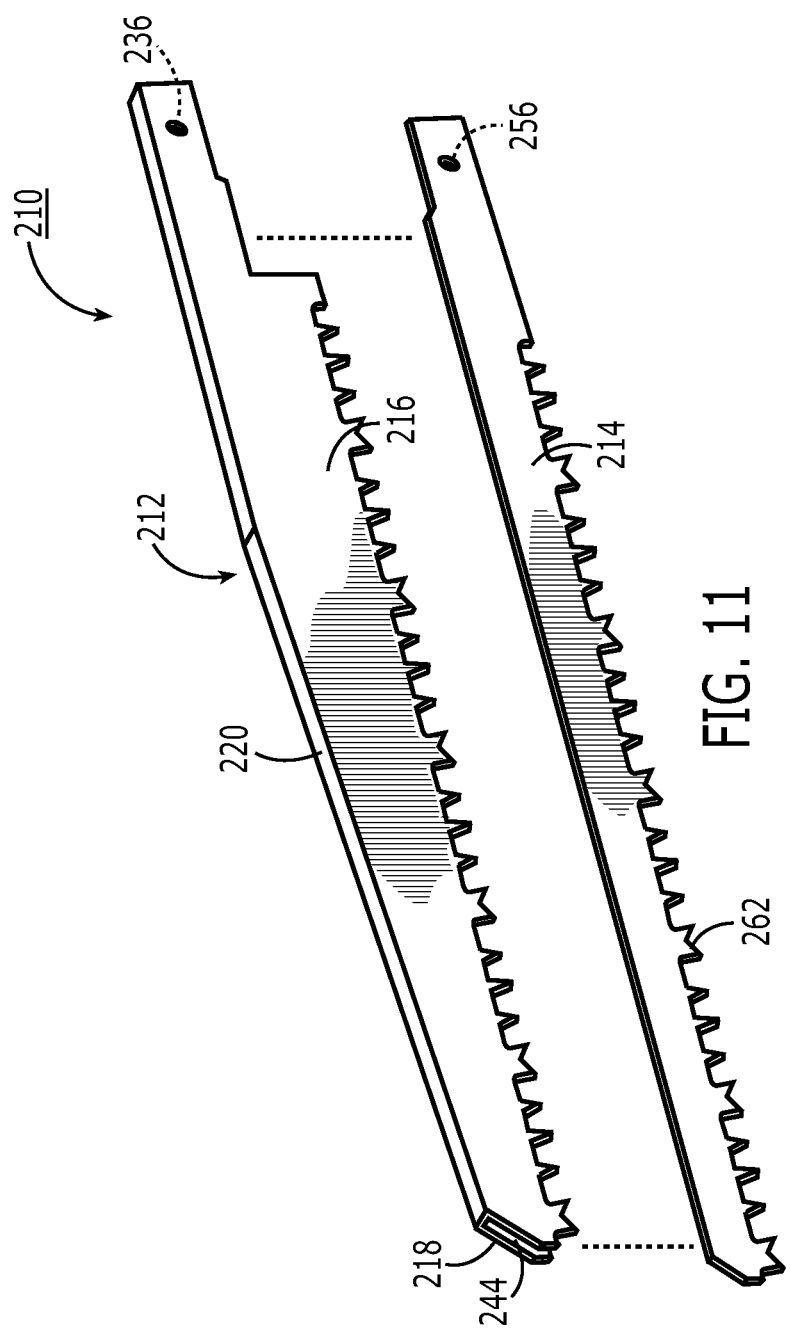
FIG. 11 is a perspective view of a reciprocating saw blade assembly according to another aspect of the disclosure.

FIG. 11 shows a dual blade assembly generally designated by the element number 212. The assembly 212 includes a raceway, slot or channel 244 formed by a top piece or ceiling 220. The channel 244, as shown, is formed between blade panels 216, 218 in which a central blade 214 reciprocates. Respective attachment points 236, 256 are used to attach the blades 212, 214 to a power saw (see, e.g., saw 1 in FIG. 1). Also shown, a set of saw teeth 262 depend from the panel 214 and a set of teeth or blades extend from panel 216. In this embodiment, teeth do not extend from panel 218 and therefore, the teeth 262 cooperate with the teeth from panel 216 to achieve cutting action. See 222 in FIG. 12.

Figure 12:
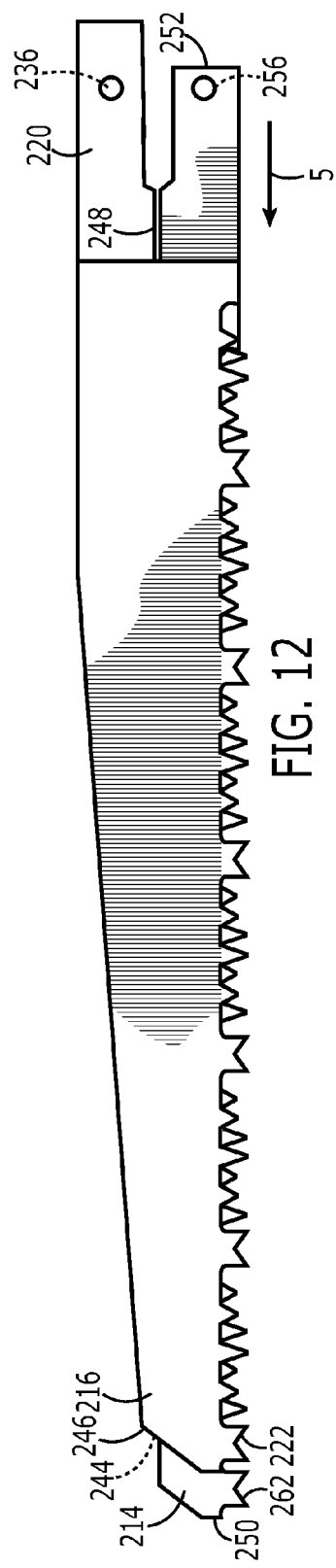
FIG. 12 is an elevational view of the assembly as in FIG. 11, particularly showing a center blade in a forward position and outer portions in a retracted position.

With reference now to FIG. 12, the assembly 210 is shown in a first operational or non-neutral position in which the center blade 214, specifically its first end 250, extends from a first end 246 of the channel 244. This position, similar to the position shown in FIG. 1, shows that a power saw can simultaneously retract the main blade assembly 212 with its teeth 222 via the connector 236 while having projected or pushed the center blade 214 in a direction 5 away from the power saw via the connector 256 at the second end 252 of the blade 214. The second end 248 of the channel 244 is also shown.

Figure 13:
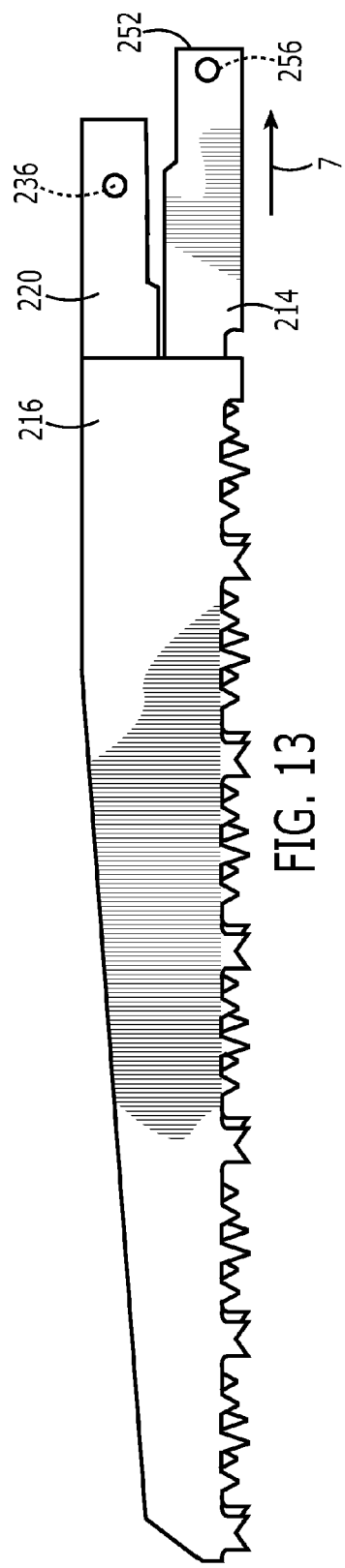
FIG. 13 is an elevational view of the assembly as in FIG. 12 showing the moving center blade in a retracted position and the outer blades in a forward position.

In FIG. 13, the assembly 210 is shown in a second operational or non-neutral position in which the center blade 214, specifically its second end 252, is retracted along the channel 244 in a second direction 7. Compare FIG. 1. Here, the power saw has again simultaneously extended the main blade assembly 212 with its teeth 222 via the connector 236 while having retracted the center blade 214 in the direction 7 towards the power saw via the connector 256. Comparing FIGS. 12 and 13 best shows the blades in different relative positions. This reciprocating action of the power saw in which the blade 214 is simultaneously moving in an opposite direction from the moving blade housing 212 and its blades 222 (compare directions 5, 7) shows the teeth 222, 262 working with and against each other to cut more efficiently through a work piece with reduced vibration and less chance of kickback, which often occurs when only one blade is moving and cutting.

Figure 14:
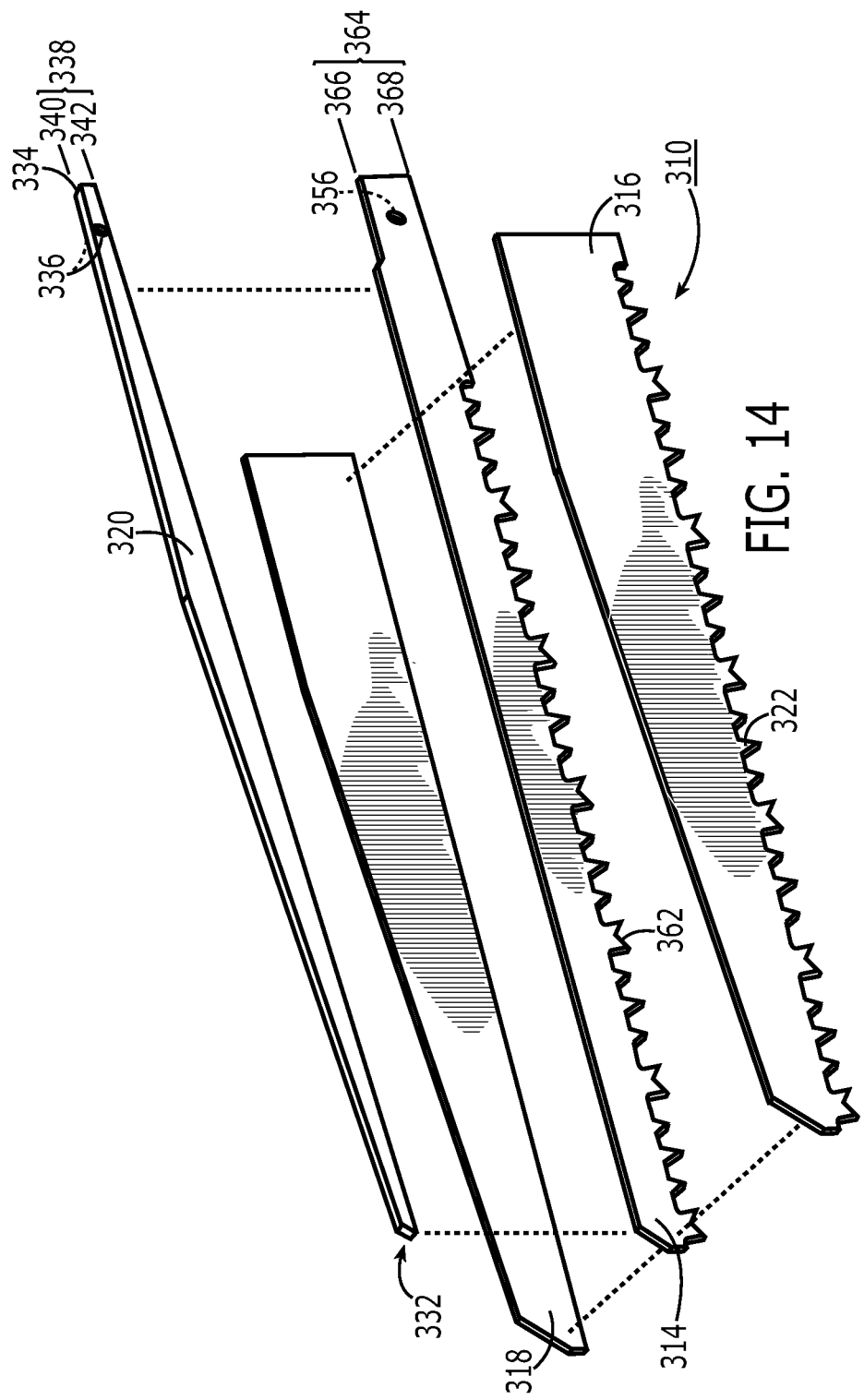
FIG. 14 is an exploded, perspective view of a reciprocating saw blade assembly.

With reference to FIG. 14, various components of a saw blade assembly are shown unassembled. Here, a first outer blade 316 includes saw blades or teeth 322, and a center blade 314 has teeth 362. In this example, the saw blades 322, 362 each have multiple teeth of various shapes, numbers and patterns. Some of the saw teeth 322, 362 may be angled outward for increased cutting or ripping capability. The number and style of teeth may be varied to accommodate user requirements.

Also shown in FIG. 14, the spacer 320 is disposed above the center blade 314 and between the outer blade panels 316, 318. When assembled with the outer blade panels 316, 318 by welding, adhesives, a rivet, a screw, and/or other mechanical attachments, the spacer 320 may form a channel or groove in which the center blade 314 rides or reciprocates. As shown, the spacer 320 is at least as wide as, or slightly wider than, the blade 314 to permit the blade 314 to reciprocate freely in the groove. However, the spacer 320 is not so wide as to prevent the blade 314 from veering excessively or bending sideways within the groove.

As further shown in FIG. 14, the spacer 320 as a first or distal end 332 and a second or proximal end 334. In this example, the proximal end 334 includes an attachment point or aperture 336 that connects to a hook or connector in a blade holder (see, e.g., power saw 1 in FIG. 1). Also shown, the spacer 320 has a height 338 as measured between a top or upper surface 340 and a lower or bottom surface 342 of the spacer 320. As discussed below, the height 338 of the spacer 320 determines in part the size of the channel (compare element 44 in FIG. 4).

Figure 15:
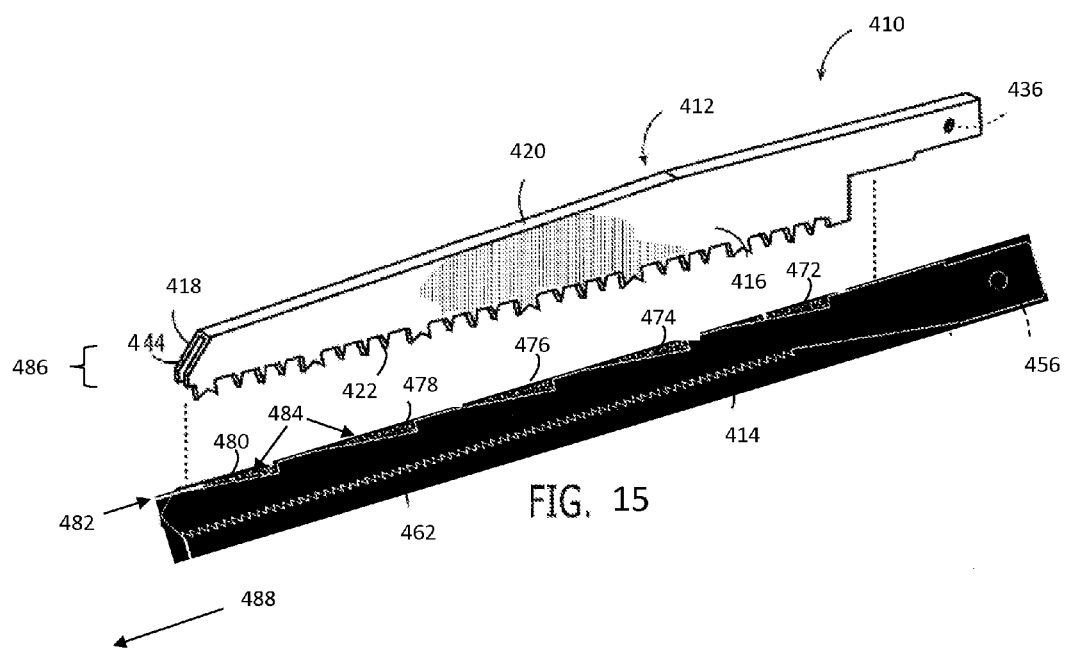
FIG. 15 is a perspective view of a reciprocating saw blade assembly according to another aspect of the disclosure.

FIG. 15 shows a dual blade assembly designated in general by the element number 412. The assembly 412 includes a raceway, slot or channel 444 formed by a top piece or ceiling 420. The channel 444 is formed between blade panels 416, 418 in which a central blade 414 reciprocates. Respective attachment points 436, 456 are used to attach the blades 412, 414 to a power saw (see, e.g., saw 1 in FIG. 1). Also shown, a set of saw teeth 462 depend from the panel 414 and a set of teeth or blades 422 extend from panel 416. The teeth 422, 462 move in opposite directions to achieve cutting action. See, e.g., 222 in FIG. 12. Also shown in FIG. 15 is a stepped configuration or plurality of dust cleaning pockets or teeth 472, 474, 476, 478, 480 situated along an upper or top edge 482 of the blade 414. As the blade 414 moves in a forward direction 488, a wood cutting byproduct such as wood particulates, chips or sawdust 484 will be pushed forward by the dust cleaning teeth; i.e., the sawdust or chips 484 will be passed from step 472 to step 474 and so on until the chips 484 are ejected by step 480 from the channel 444. As shown, a space or gap 486 may be provided between the top edge 482 and the ceiling 420 within the channel 444 to facilitate the step-by-step wood chip removal process to alleviate or prevent gumming or sticking action between the blades 414, 416, particularly in proximity to the ceiling 420.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A saw blade assembly for a power saw, the assembly comprising:
  a housing blade assembly having a first panel and a second panel connected to each other, at least one of the first and second panels having a first plurality of saw teeth depending therefrom, the housing blade assembly further including a first means for connection to a reciprocating driver mechanism, the housing blade assembly being drivable in a first direction and in an opposing second direction by the reciprocating driver mechanism; and
  a blade interposed between the first panel and the second panel of the housing blade assembly, the blade having a second plurality of saw teeth depending therefrom and including a second means for connection to the reciprocating driver mechanism, the blade being drivable opposite the housing blade assembly in one of the first direction or the opposing second direction by the reciprocating driver mechanism, the blade further comprising a plurality of dust cleaning teeth disposed apart from the second plurality of saw teeth, the plurality of dust cleaning teeth being configured to eject cutting byproduct.

2. The saw blade assembly as in claim 1, wherein the first means for connection is a proximal end of the housing blade assembly having an aperture formed therethrough configured to attach operatively to the reciprocating driver mechanism.

3. The saw blade assembly as in claim 1, wherein the second means for connection is a proximal end of the blade having an aperture formed therethrough configured to attach operatively to the reciprocating driver mechanism.

4. The saw blade assembly as in claim 1, wherein the blade is spaced apart from the first panel and the second panel.

5. The saw blade assembly as in claim 1, wherein the plurality of dust cleaning teeth are disposed on an edge of the blade.

6. The saw blade assembly as in claim 5, wherein the dust cleaning teeth are disposed on a top edge of the blade and spaced apart from a ceiling formed by the first panel and the second panel.

* * * * *